US007597157B2

(12) United States Patent
Stierle et al.

(10) Patent No.: US 7,597,157 B2
(45) Date of Patent: Oct. 6, 2009

(54) ELECTRIC POWER TOOL HAVING COOLING CONDUITS

(75) Inventors: Peter Stierle, Waldenbuch (DE); Juergen Wiker, Leinfelden-Echterdingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/550,047

(22) PCT Filed: Sep. 24, 2004

(86) PCT No.: PCT/DE2004/002129

§ 371 (c)(1), (2), (4) Date: Sep. 21, 2005

(87) PCT Pub. No.: WO2005/039822

PCT Pub. Date: May 6, 2005

(65) Prior Publication Data

US 2006/0266538 A1 Nov. 30, 2006

(51) Int. Cl.
*H02K 9/04* (2006.01)

(52) U.S. Cl. ....................... 173/217; 173/213; 173/171; 310/56

(58) Field of Classification Search ................ 30/123.3; 451/449; 173/168–169, 171, 217, 199; 310/56, 310/57, 52

See application file for complete search history.

(56) References Cited

U.S. PATENT DOCUMENTS

| | | | | | |
|---|---|---|---|---|---|
| 1,431,907 | A | * | 10/1922 | Cramer | 417/371 |
| 1,673,012 | A | * | 6/1928 | Meunier | 310/88 |
| 1,743,134 | A | * | 1/1930 | Hammond et al. | 310/56 |
| 1,816,506 | A | * | 7/1931 | Wait | 310/56 |
| 2,056,293 | A | * | 10/1936 | Ludvik | 173/75 |
| 2,155,082 | A | * | 4/1939 | Decker | 173/217 |
| RE22,964 | E | * | 1/1948 | Burch | 175/13 |
| 2,452,268 | A | * | 10/1948 | Schumann | 173/75 |
| 2,456,571 | A | * | 12/1948 | Turner et al. | 310/50 |
| 2,776,385 | A | * | 1/1957 | Modrey | 310/71 |
| 2,976,436 | A | * | 3/1961 | Anton | 173/50 |
| 3,818,255 | A | * | 6/1974 | Wagner | 310/50 |
| 3,840,762 | A | * | 10/1974 | Kasabian | 310/50 |
| 4,399,378 | A | * | 8/1983 | Krumm et al. | 310/56 |
| 4,728,840 | A | * | 3/1988 | Newhouse | 310/113 |
| 4,830,119 | A | * | 5/1989 | Haney et al. | 173/21 |
| 5,099,160 | A | | 3/1992 | Strozel et al. | |
| 5,332,163 | A | * | 7/1994 | Schnizler | 241/56 |
| 5,753,986 | A | * | 5/1998 | Ohtani | 310/56 |
| 6,113,320 | A | * | 9/2000 | Ostermeier et al. | 408/56 |
| 6,127,751 | A | * | 10/2000 | Kristen et al. | 310/50 |
| 6,220,046 | B1 | * | 4/2001 | Kristen et al. | 62/259.2 |
| 6,543,549 | B1 | * | 4/2003 | Riedl et al. | 173/216 |

(Continued)

FOREIGN PATENT DOCUMENTS

| | | |
|---|---|---|
| CH | 692 488 | 7/2002 |

(Continued)

*Primary Examiner*—Rinaldi I. Rada
*Assistant Examiner*—Lindsay Low
(74) *Attorney, Agent, or Firm*—Michael J. Striker

(57) ABSTRACT

An electric power tool includes an electric motor located in a housing (10) and a cooling device (16, 18, 20, 30, 32). The cooling device (16, 18, 20, 30, 32), at least in some regions, has a cooling conduit (30) that is closed off from an interior of the housing (10).

26 Claims, 3 Drawing Sheets

U.S. PATENT DOCUMENTS

| | | | | |
|---|---|---|---|---|
| 6,758,288 | B2 * | 7/2004 | Richter et al. | 173/217 |
| 6,962,523 | B2 * | 11/2005 | Fraser et al. | 451/259 |
| 2001/0052419 | A1 * | 12/2001 | Quirijnen et al. | 173/217 |
| 2004/0263008 | A1 * | 12/2004 | Voigt et al. | 310/58 |
| 2005/0153636 | A1 * | 7/2005 | Numata et al. | 451/358 |
| 2005/0247463 | A1 * | 11/2005 | Wuensch | 173/75 |
| 2006/0181159 | A1 * | 8/2006 | Dehde | 310/51 |

FOREIGN PATENT DOCUMENTS

| | | | |
|---|---|---|---|
| GB | 789189 | | 1/1958 |
| GB | 2 309 927 | | 8/1997 |
| GB | 2 309 927 | A | 8/1997 |

* cited by examiner

ELECTRIC POWER TOOL HAVING COOLING CONDUITS

CROSS REFERENCE

The invention described and claimed hereinbelow is also described in PCT/DE 2004/002129, filed Sep. 24, 2004 and DE 103 47 943.0, filed Oct. 15, 2003. This German Patent Application, whose subject matter is incorporated here by reference, provides the basis for a claim of priority of invention under 35 U.S.C. 119 (a)-(d).

BACKGROUND OF THE INVENTION

The invention is based on an electric power tool.

In right-angle grinders, the cooling air required for cooling the electric motor is as a rule aspirated through lateral air inlet openings, which are located in the rear portion of the housing. It is also known to provide air inlet openings on a rear end face of the housing as well. In typical air courses, the cooling air is aspirated into the interior of a housing through a fan located on the armature shaft. Along the way from the air inlet to the air outlet, the cooling air strikes various components in the interior of the housing that deflect the cooling air, making it turbulent and slowing it down.

In various electric power tools, the housing can be used as a handle, but then there is the risk that the lateral air inlet openings will be covered by the user's hand, and then air is aspirated only through the face-end air inlet openings. However, those openings are relatively small in proportion to the lateral openings, and so only little air can reach the housing. The lateral air inlet openings cannot be made arbitrarily longer or larger, though, because then the spacings from current-carrying parts in the interior of the housing that might otherwise be needed cannot be adhered to.

SUMMARY OF THE INVENTION

The invention is based on an electric power tool, having an electric motor located in a housing and having a cooling device.

It is proposed that the cooling device, at least in some regions, has a cooling conduit that is closed off from an interior of the housing. The cooling medium, preferably cooling air, can be purposefully made to bypass interfering components. A high flow speed and a high volumetric throughput can be achieved. Any dirt aspirated with the cooling air can be made to flow past vulnerable parts such as brushes or switches, and dirt can be prevented from becoming deposited on them. Because of the purposeful course of the cooling medium, the temperature at the electric motor drops, which increases its efficiency and lengthens its life. Precisely in heavy-duty right-angle grinders, this arrangement offers major advantages. A substantially closed cooling conduit should be understood in particular to mean cooling conduits that have recesses such as slits, small holes and the like that are at least largely negligible in fluidic terms.

If the cooling conduit is let into a support plate of a motor housing, then it can favorably be already provided upon manufacture of the support plate and incorporated into the support plate in a space-saving, optimized way.

If the cooling conduit is covered with a cover plate, a closed cooling conduit can be furnished, in which the cooling medium can flow unimpeded by components in the interior of the housing. Removing the cover plate makes it possible to clean the cooling conduit easily as needed.

If the cover plate is embodied integrally with a motor housing, then a separate cover plate can be dispensed with. Manufacture is especially simple, and if the motor housing is made by injection molding, the cover plate is simple to mold jointly with it.

If the cooling conduit discharges into an intake nozzle that protrudes from the housing, then it is practically precluded that the intake nozzle will be covered by mistake when the user is working with the electric power tool. Moreover, cooling air reaches the cooling conduit directly and unhindered and can be carried directly wherever it is needed. The cross section of the cooling conduit is variable and will be provided by one skilled in the art to suit the requirements of the particular electric power tool. Fundamentally, however, it is also conceivable for the cooling conduit or an intake nozzle to be flush with the housing, particularly in the region outside a grip region, so that places where dirt could become deposited are advantageously avoided.

If the intake nozzle is located in a face end of the housing, the cooling conduit can be supplied with cooling air without hindrance, even if the housing serves as a handle.

If the cooling conduit has an essentially rectilinear course, then the cooling air reaches the electric motor unhindered, without hindrance from components that stand in the way of the flow. Less turbulence is created in the flow path, so that any dirt entrained is less able to become deposited, and a high speed of the cooling medium can be maintained. Smaller inlet openings can be provided for furnishing a required quantity of cooling medium.

If at least two cooling conduits are provided, then better distribution of the coolant supply can be made. The number of cooling conduits is variable and will be selected by one skilled in the art to suit the requirements of the particular electric power tool. In principle, however, it is also conceivable for only one cooling conduit to be provided.

If lateral and/or face-end air inlet conduits are provided, then cooling of components in the interior of the housing can also be done, without impairing the cooling of the electric motor.

The electric power tool is especially advantageously embodied as a right-angle grinder, in which an overload on the drive can in principle easily occur, which necessitates especially reliable cooling.

BRIEF DESCRIPTION OF THE DRAWINGS

Further advantages will become apparent from the ensuing description of the drawings. In the drawings, one exemplary embodiment of the invention is shown. The drawings, description and claims include numerous characteristics in combination. One skilled in the art will expediently consider these characteristics individually as well and put them together to make useful further combinations.

Shown are.

DETAILED DESCRIPTION OF THE EXEMPLARY EMBODIMENT

Figure 1:
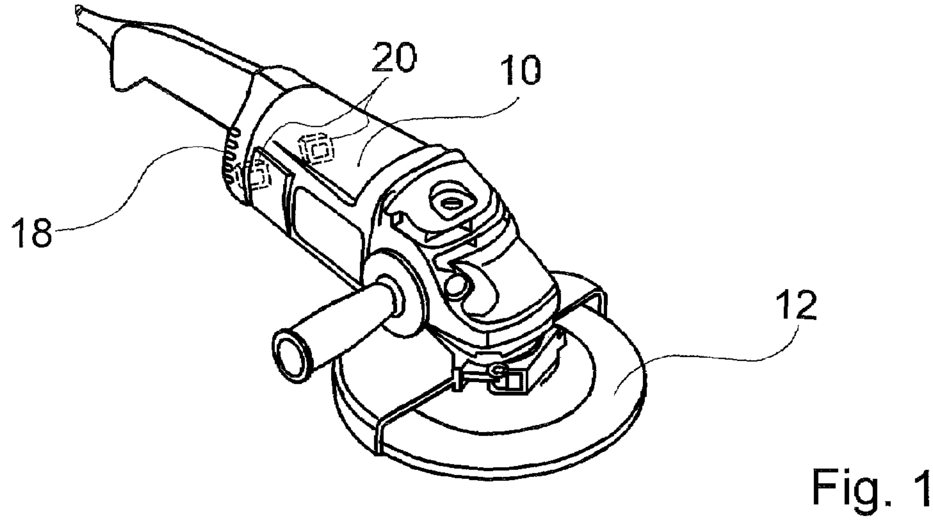
FIG. 1, a preferred right-angle grinder.

FIG. 1 shows an electric power tool in the form of a preferred right-angle grinder, with an electric motor located in a housing 10 and with a cooling device, in which an intake nozzle 20 is located on the rear face end of the housing 10. The right-angle grinder may additionally have a handle that protrudes from the housing 10 at an angle. The housing 10 itself is also used as a handle. The electric motor preferably drives a rotationally drivable tool insert 12, such as a grinding wheel.

Figure 2:
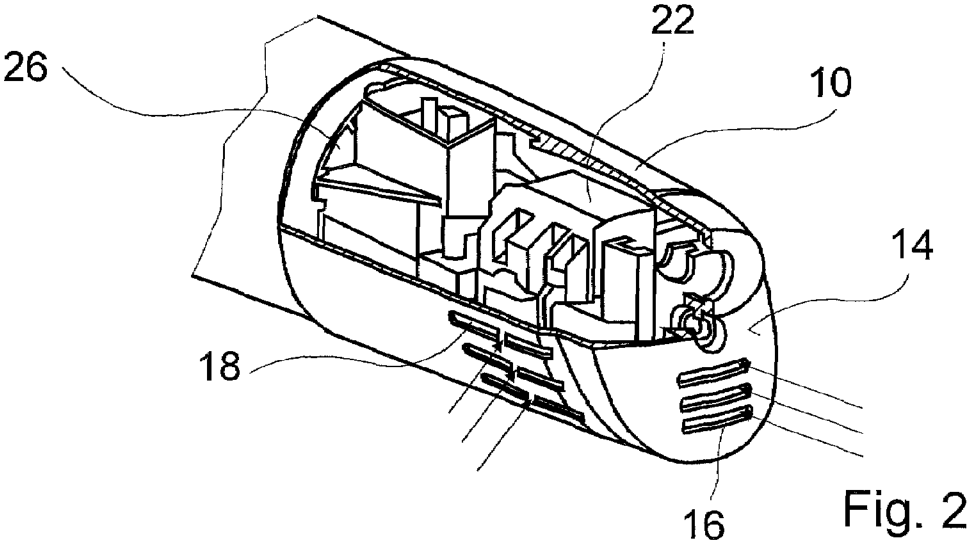
Fig. 2 PRIOR ART
FIG. 2, details of a housing in the prior art.
Figure 3:
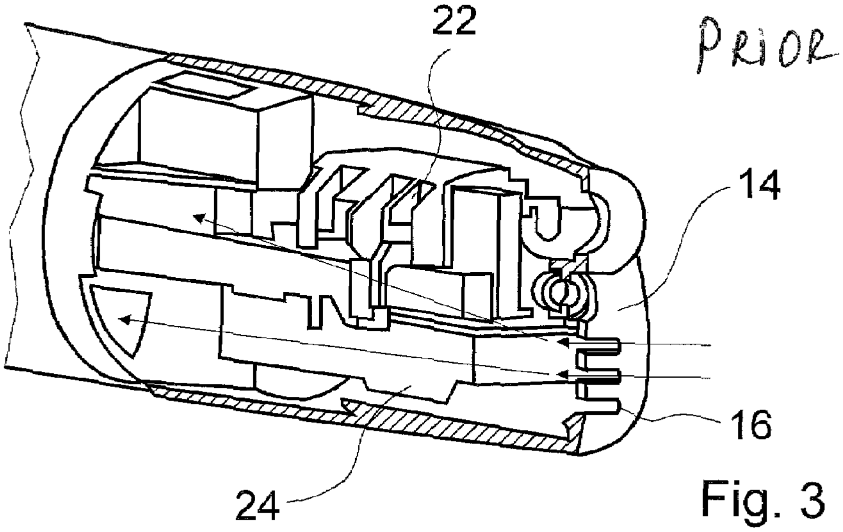
Fig. 3 PRIOR ART
FIG. 3, details of an air course of the prior art.

FIGS. 2 and 3 illustrate a cooling air course in accordance with the prior art. The same elements are identified by the same reference numerals throughout the drawings. The housing 10 is cut open to show conditions in the interior of the housing 10. Air aspirated by a fan, not shown, flows through lateral and face-end air inlet openings 18, 16 into the housing 10. The lateral air inlet openings 18 may be provided on both sides of the housing 10. After entering the housing 10, the cooling air strikes components, such as the switch 22 and electronics 24, that intrinsically require no cooling, or only little cooling. On flowing past these components 22, 24, eddies are created, which slow down the cooling air and cause dirt entrained with it to become deposited there. The heavy arrows in the drawings (FIG. 2 and FIG. 3) are intended to indicate that after the cooling air enters, it must first flow around obstacles in the form of the components 22, 24, before it reaches the interior of a motor housing 26, where it is needed for cooling the armature and pole piece of the electric motor.

Figure 4:
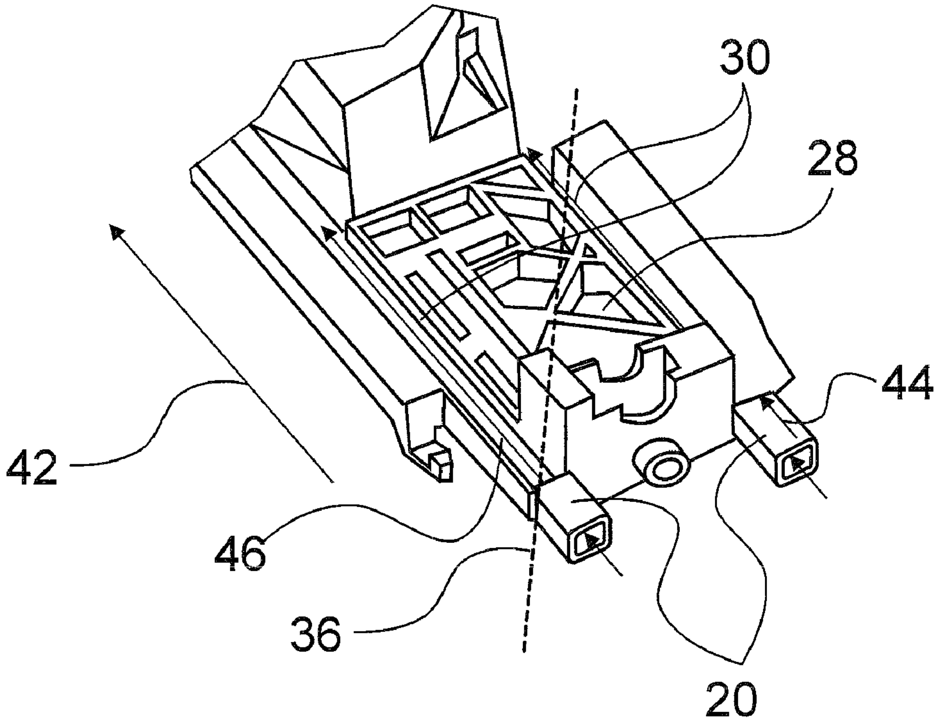
FIG. 4, a view of a support plate, with cooling conduits according to the invention.
Figure 5:
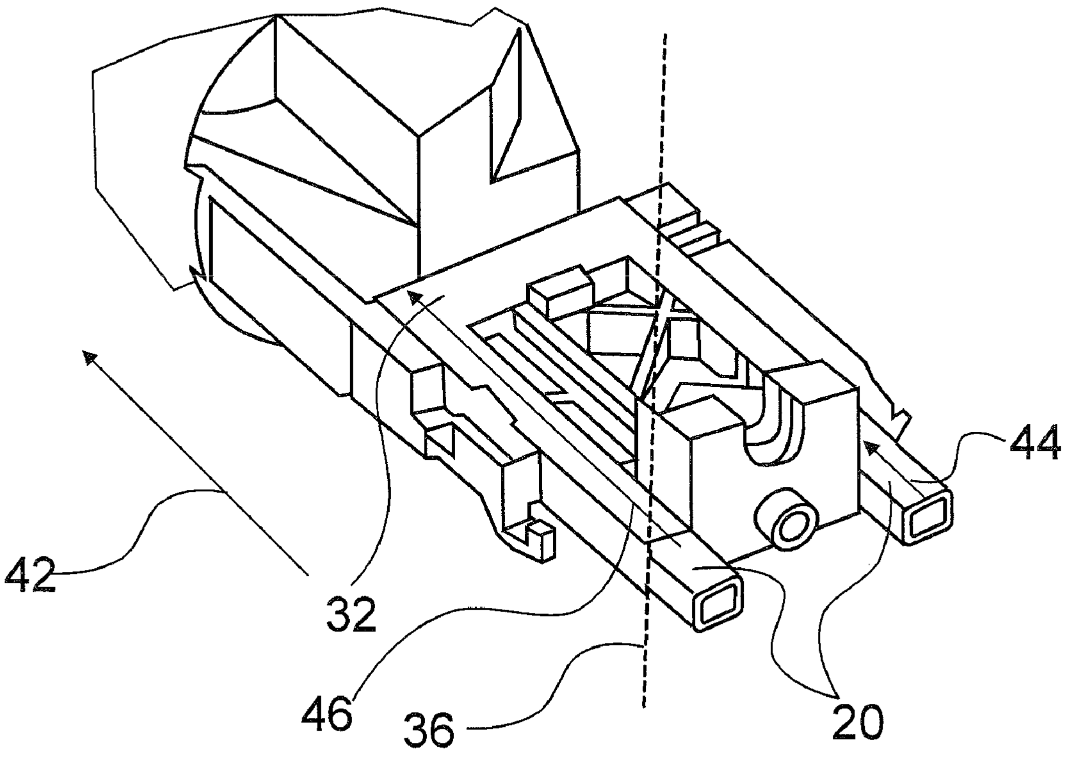
FIG. 5, the cooling conduits of FIG. 4 with a cover plate.

The arrangement according to the invention is shown in the following FIGS. 4 through 7. Two cooling conduits 30 are let into a support plate 28 in the motor housing 26 and extend essentially rectilinearly from two intake nozzles 20, located in a face end 14 of the housing 10, to the motor housing 26 (FIG. 4). The intake nozzles 20 protrude from the housing 10. The cooling conduits 30 are covered by a cover plate 32 (FIG. 5), so that airtight cooling conduits 30 are formed. The cover plate 32 may be joined either detachably or fixedly to edges of the cooling conduits 30, for instance being glued, screwed or clamped onto the cooling conduits 30. The cover plate 32 may be formed of a single piece for all the cooling conduits 30, or a separate cover plate 32 may be provided for each cooling conduit 30.

Figure 6:
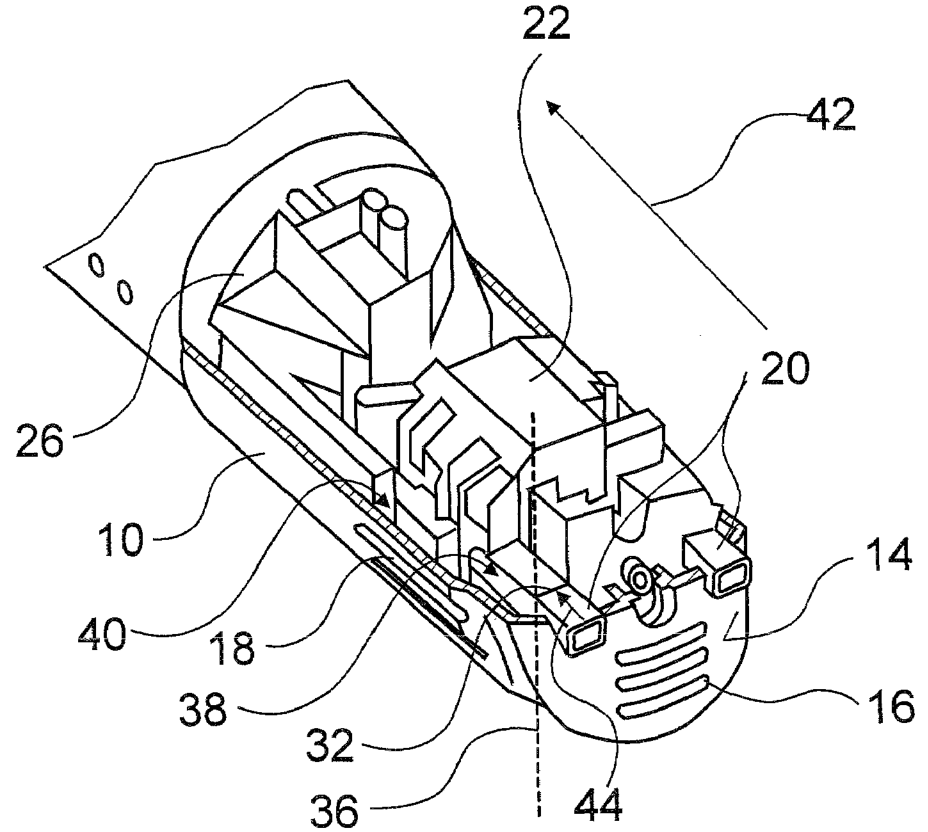
FIG. 6, the arrangement of FIG. 5 with the switch installed.

FIG. 6 shows a switch 22, which is mounted in the housing on the cooling conduits 30 or the cover plate 32. In the cooling conduits 30, the cooling air reaches the motor housing 26 unaffected by the switch 22.

Figure 7:
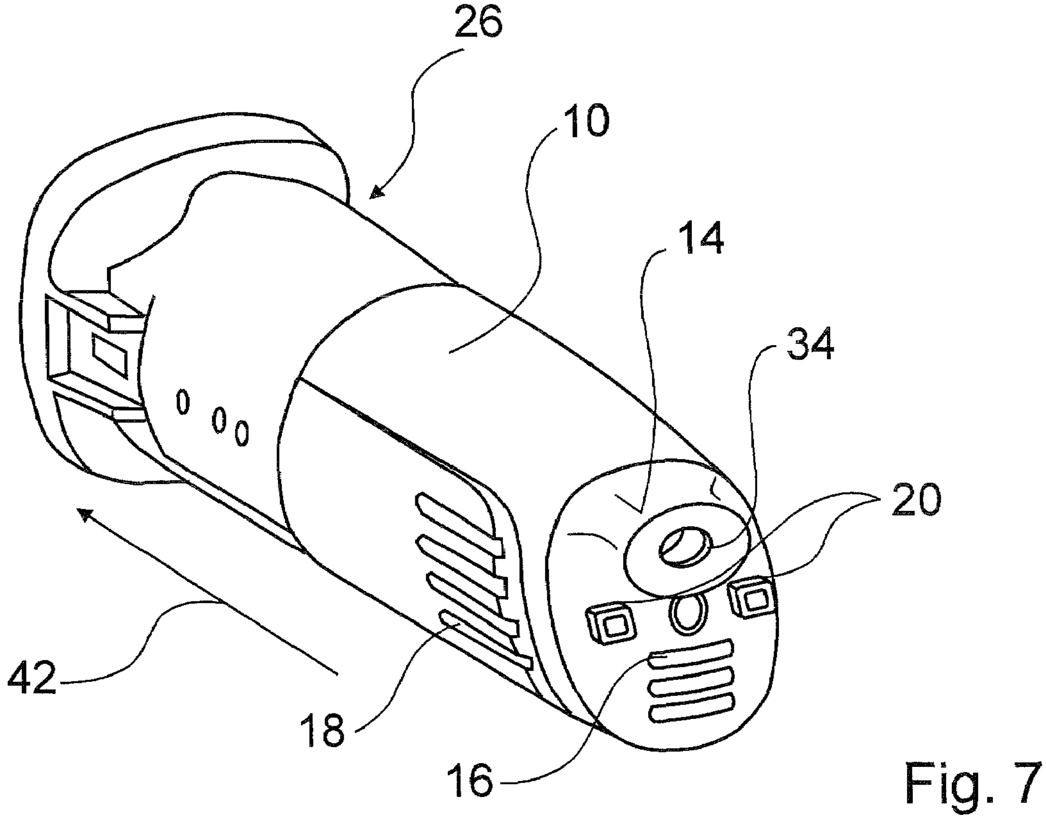
FIG. 7, a detail of a full assembled housing with intake nozzles.

FIG. 7 shows a fully assembled housing 10 with additional face-end and lateral air inlet openings 16, 18. The intake nozzles 20 for the closed cooling conduits 30 in the interior of the housing 10 are located between a cord connection 34 and the air inlet openings 16 in the face end 14 of the housing 10.

The housing 10 extends in a longitudinal direction 42. The cooling conduit 30 of the cooling device is located in direct proximity to the at least one intake nozzle 20 and is separated from the housing 10 in a direction which is transverse to the longitudinal direction by means of an additional casing 38. The additional casing 38 is located between the cooling conduit 30 and the housing 10 in the transverse direction.

The cooling conduit 30 has a longitudinal direction which extends over an entire extension of the cooling conduit 30 in the same direction as the longitudinal direction 42 of the housing 10. The intake nozzles 20 and the cooling conduits 30 share a borderline 36 with each other.

An additional cooling conduit 40 is further provided. This is suppliable with air through the inlet openings 16, 18. The additional cooling conduit 40 is separated from the cooling conduit 30. The cooling conduit 40 in its entirety extends in a direction which is parallel to the longitudinal direction 42 of the housing 10.

The additional casing 38 is configured as an extension of the intake nozzle 20 in a longitudinal direction 44 of the intake nozzle 20. The longitudinal direction 44 of the intake nozzle 20 has the same direction as the longitudinal direction 42 of the housing.

The additional casing 38 is configured in a nonintegral manner with the housing 10 and in its entirety extends in a direction which is parallel to the longitudinal direction 42 of the housing 10. The additional casing 38 is configured so that it leads cooling air from the intake nozzle 20 to a motor housing 26.

List of Reference Numerals

10 Housing
12 Tool insert
14 Face end
16 Air inlet openings
18 Air inlet openings
20 Intake nozzle
22 Switch
24 Electronics
26 Motor housing
28 Support plate
30 Cooling conduit
32 Cover plate
34 Cord connection

The invention claimed is:

1. An electric power tool, having an electric motor located in a housing (10), and having a cooling device (16, 18, 20, 30, 32), wherein the cooling device (16, 18, 20, 30, 32) comprises at least one intake nozzle (20) extending in a longitudinal direction (42) of the housing (10), wherein said longitudinal direction (42) extends parallel to at least one side wall of said housing (10), wherein said at least one intake nozzle (20) is mounted in an outer wall of the housing (10), wherein the cooling device (16, 18, 20, 30 32) further comprises a cooling conduit (30) which is located in direct proximity to the at least one intake nozzle (20) and is separated from the housing (10) in a direction which is transverse to said longitudinal direction (42) by means of an additional casing (38) located between the cooling conduit (30) and the housing (10) in the transverse direction, wherein said additional casing (38) is located in an interior of said housing (10), wherein said cooling conduit (30) directly abuts said at least one intake nozzle (20) and is closed off in direct proximity to said at least one intake nozzle (20) from an interior of the housing (10), wherein cooling air reaches the cooling conduit (30) directly and unhindered in an operating mode, wherein at least two said cooling conduits (30) are provided, wherein said cooling conduits (30) in their entirety extend in a direction which is parallel to the longitudinal direction (42) of the housing (10) and in their entirety are arranged parallel relative to each other, wherein said cooling conduits (30) are formed in an interior of said additional casing (38), wherein at least two said intake nozzles (20) are provided which extend in said cooling conduits (30), wherein at each of said two cooling conduits (30) one of said two intake nozzles (20) is arranged, and wherein said intake nozzles (20) and said cooling conduits (30) are provided to lead cooling air unhindered from said intake nozzles (20) to a motor housing (26) in which said electric motor is located.

2. The electric power tool in accordance with claim 1, wherein the cooling conduit (30) is let into a support plate (28) of a motor housing (26).

3. The electric power tool in accordance with claim 1, wherein the cooling conduit (30) is covered with a cover plate (32).

4. The electric power tool in accordance with claim 3, wherein the cover plate (32) is embodied integrally with a motor housing (26).

5. The electric power tool in accordance with claim 1, wherein the cooling conduit (30) discharges into an intake nozzle (20) protruding from the housing (10).

6. The electric power tool in accordance with claim 5, wherein the intake nozzle (20) is located in a face end (14) of the housing (10).

7. The electric power tool in accordance with claim 1, wherein the cooling conduit (30) extends substantially rectilinearly.

8. The electric power tool in accordance with claim 1, wherein lateral and/or face-end air inlet openings (16, 18) are provided.

9. A right-angle grinder having a cooling device in accordance with claim 1.

10. The electrical power tool in accordance with claim 1, wherein at least two air inlet openings (16, 18, 20) that are different in design are provided.

11. The electric power tool in accordance with claim 1, wherein the cooling conduit (30) forms a bypass for the cooling medium to avoid an interference of the cooling medium with components (22) in an operating mode.

12. The electric power tool in accordance with claim 1, wherein said at least one intake nozzle (20) and the cooling conduit (30) share a borderline (36) with each other.

13. The electric power tool in accordance with claim 1, wherein said at least one intake nozzle (20) is formed as one piece with the cooling conduit (30).

14. The electric power tool in accordance with claim 8, further comprising an additional cooling conduit (40), wherein said additional cooling conduit (40) is suppliable with air through the inlet openings (16, 18).

15. The electric power tool in accordance with claim 14, wherein said additional cooling conduit (40) is separated from the cooling conduit (30).

16. The electric power tool in accordance with claim 1, wherein the additional casing (38) is configured as an extension of the intake nozzle (20) in the longitudinal direction (44) of the intake nozzle (20).

17. The electric power tool according to claim 1, wherein a longitudinal direction (44) of the intake nozzle (20) has a same direction as the longitudinal direction (42) of the housing (10).

18. The electric power tool according to claim 1, wherein the additional casing (38) in its entirety extends in a direction which is parallel to the longitudinal direction (42) of the housing (10).

19. The electric power tool according to claim 1, wherein the additional casing (38) is configured so that it leads cooling air from the intake nozzle (20) to a motor housing (26).

20. The electric power tool according to claim 19, wherein the cooling conduit (30) extends rectilinearly from the intake nozzle (20) to a motor housing (26).

21. The electric power tool according to claim 1, wherein—relative to the longitudinal direction (42) of the housing (10)—the intake nozzle (20) is placed in front of the electric motor and an exhaust for blowing the cooling air out of the housing (10) is arranged behind the electric motor.

22. The electric power tool according to claim 1, wherein the cooling conduits (30) are linear and parallel to each other.

23. The electric power tool according to claim 1, wherein the intake nozzles (20) are configured exclusively to aspirate cooling air.

24. The electric power tool according to claim 1, wherein the additional casing (38) and the housing (10) are configured as separately manufactured parts.

25. The electric power tool according to claim 1, wherein the additional casing (38) and the housing (10) are parts which are separated from each other.

26. The electric power tool according to claim 1, being formed as an angle grinder.

* * * * *